(12) United States Patent
Dottax et al.

(10) Patent No.: US 12,212,688 B2
(45) Date of Patent: Jan. 28, 2025

(54) METHOD FOR CRYPTOGRAPHIC SIGNATURE OF A DATUM, ASSOCIATED ELECTRONIC DEVICE AND ASSOCIATED COMPUTER PROGRAM

(71) Applicant: IDEMIA FRANCE, Courbevoie (FR)

(72) Inventors: Emmanuelle Dottax, Courbevoie (FR); Agathe Houzelot, Courbevoie (FR); Christophe Giraud, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 111 days.

(21) Appl. No.: 18/168,725

(22) Filed: Feb. 14, 2023

(65) Prior Publication Data

US 2023/0283480 A1   Sep. 7, 2023

(30) Foreign Application Priority Data

Mar. 3, 2022   (FR) ..................................... 22 01866

(51) Int. Cl.
| | |
|---|---|
| *G06F 21/00* | (2013.01) |
| *H04L 9/08* | (2006.01) |
| *H04L 9/30* | (2006.01) |
| *H04L 9/32* | (2006.01) |
| *H04L 29/06* | (2006.01) |

(52) U.S. Cl.
CPC .......... *H04L 9/3247* (2013.01); *H04L 9/0869* (2013.01); *H04L 9/3066* (2013.01)

(58) Field of Classification Search
None
See application file for complete search history.

(56) References Cited

U.S. PATENT DOCUMENTS

| | | | | |
|---|---|---|---|---|
| 2013/0024699 A1* | 1/2013 | Muir | ..................... | H04L 9/3252 713/176 |
| 2013/0097420 A1* | 4/2013 | Zaverucha | ............ | H04L 9/3252 713/156 |

FOREIGN PATENT DOCUMENTS

EP   2 553 866 B1   11/2018

OTHER PUBLICATIONS

French Preliminary Search Report Issued Oct. 13, 2022 in French Application 22 01866 filed on Mar. 3, 2022 (with English Translation of Categories of Cited Documents & Written Opinion), 12 pages.
Dottax, et al., "White-Box ECDSA: Challenges and Existing Solutions", ARXIV.org, XP047614346, 2021, pp. 184-201.

* cited by examiner

*Primary Examiner* — Lisa C Lewis
(74) *Attorney, Agent, or Firm* — Oblon, McClelland, Maier & Neustadt, L.L.P.

(57) ABSTRACT

A method for cryptographic signature of a datum comprises determining: a signature point equal to the addition of elements equal to a derived first point and of number equal to a first scalar; a second scalar by subtracting, from the product of the first scalar and of a selected scalar, the product of a third and of a fourth scalar; another signature point equal to the addition of elements equal to a selected point and of number equal to the second scalar, and of elements equal to a derived second point and of number equal to the fourth scalar; and a signature portion based on a private key, on the first scalar, on a coordinate of the signature point and on the datum. The derived first and second point are respectively equal to the addition of elements equal to a generator point and of number equal to a fifth and to the third scalar.

16 Claims, 3 Drawing Sheets

[Fig 1]
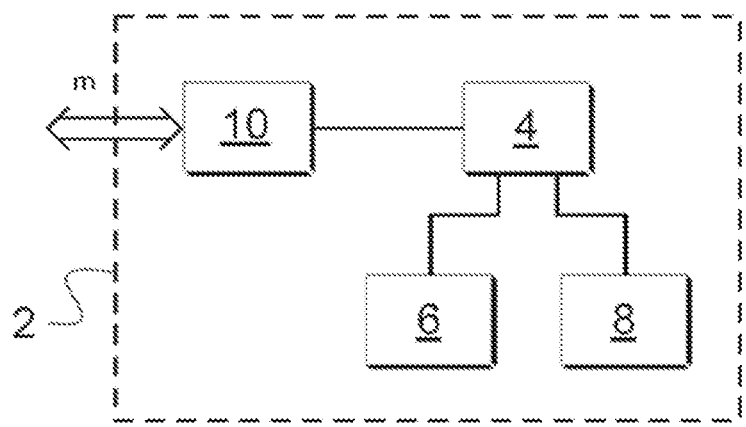
[Fig 2]
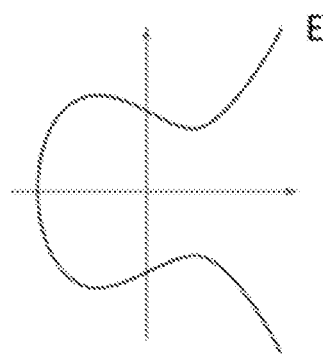
$Gr = E(K)$

[Fig 3]
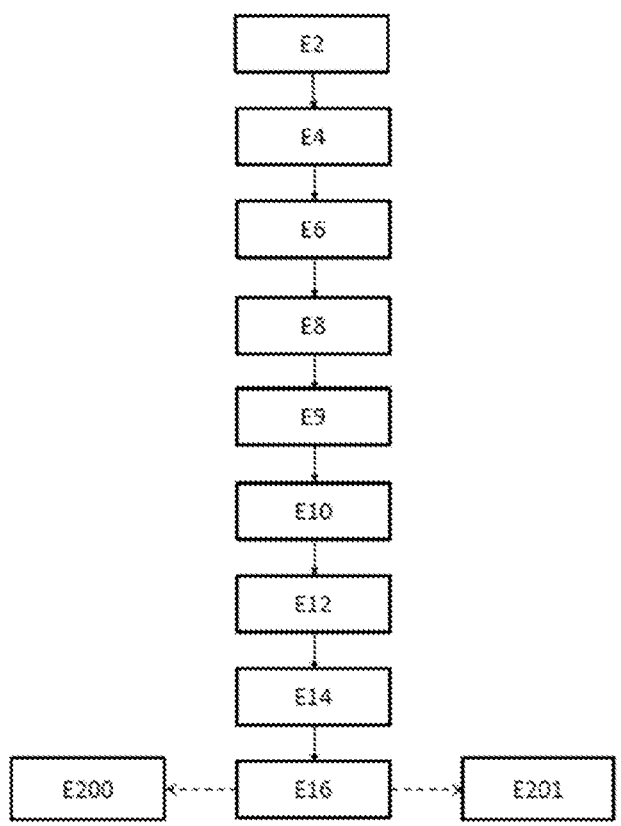

[Fig 4]
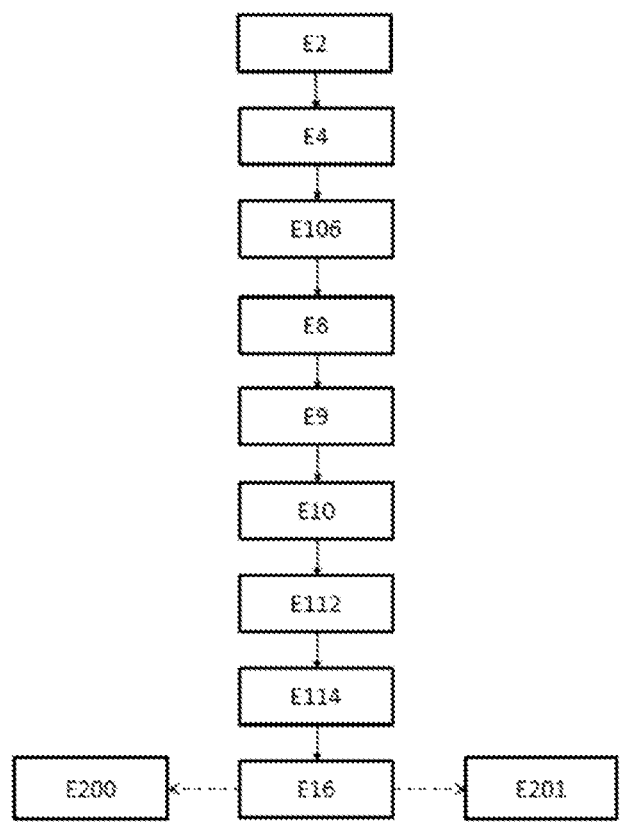

METHOD FOR CRYPTOGRAPHIC SIGNATURE OF A DATUM, ASSOCIATED ELECTRONIC DEVICE AND ASSOCIATED COMPUTER PROGRAM

The present invention relates to the technical field of cryptography.

It relates more particularly to a cryptographic processing method, and to an associated electronic device and to an associated computer program.

When a cryptographic algorithm is implemented by way of software executed in a non-secure environment, specific measures have to be taken to avoid an attacker being able to gain access to secret data (for example cryptographic keys) by simply taking control of this environment.

The search for techniques for securing the implementation of a cryptographic algorithm in a non-secure environment is known as "white box cryptography".

The article "White Box Cryptography and an AES implementation", by S. Chow et al. in Post-Proceedings of the 9th Annual Workshop on Selected Areas in Cryptography (SAC'02), 15-16 Aug. 2002 proposes for example a technique for producing AES algorithms each adapted to a specific cryptographic key.

For the solutions that are generally proposed in this context, the cryptographic algorithm is decomposed into a series of elementary processing operations and lookup tables respectively associated with these elementary processing operations are used to manipulate masked data.

These solutions consume a particularly large amount of memory due to the use of these numerous lookup tables.

Elliptic curve cryptographic data processing is known, for example for signature of a datum. The FIPS 186-4 standard "Digital Signature Standard (DSS)" from the National Institute of Standards and Technology (NIST) published in July 2013 thus describes an ECDSA signature algorithm.

The properties of elliptic curves on finite bodies are used in computations involved in the processing of data, such as the signature of a datum. This involves manipulating elements of a group of points of an elliptic curve, of finite order and provided with an operation of adding two points of the elliptic curve.

To sign a datum by way of a private key, a first element of the group is associated with a generator point of said group and an affine coordinate of a signature point equal to the combination, by way of said operation, of elements equal to the generator point and of number equal to a first scalar, is determined. A signature portion is also determined based on the private key, on the first scalar, on said affine coordinate and on the datum. The signature of the message consists of the affine coordinate and of the signature portion.

The first scalar that is used may be determined through a random draw, but it may be relatively easy for an attacker to block the random sources, in particular in the context of white-box implementations. The first scalar that is used may also be determined by applying a pseudorandom algorithm to the datum.

In each of these two cases, the signature of a given message will then always be the same, thereby facilitating the attack proposed in "Attacking Deterministic Signature Schemes using Fault Attacks", by Damian Poddebniak, Juraj Somorovsky, Sebastian Schinzel, Manfred Lochter and Paul Rosler, DOI 10.1109/EuroSP.2018.00031, 2018.

This attack consists in signing the same datum twice and in disrupting the computing of the affine coordinate. An attacker thus obtains the correct affine coordinate, an incorrect affine coordinate, the correct signature portion and an incorrect signature portion with the incorrect affine coordinate. He is then able to recover the private key used to sign the datum.

There are two methods for protecting against this attack.

The first method consists in verifying the signature of the datum using a public key associated with the private key. However, the verification is slower than the signature and implementing it in white box form also consumes a particularly large amount of memory.

The second method consists in computing the signature of the datum twice and in comparing the two signatures thus computed. However, this method doubles the computing time and requires doubling the white-box implementation in order to ward off double fault attacks that inject the same error, thereby consuming twice as much memory.

In order to rectify these drawbacks, the present invention proposes a method for cryptographic signature of a datum, implemented within an electronic device based on a private key and on a finite group of points of an elliptic curve, said group being provided with an operation of adding two points of the elliptic curve and comprising a generator point, the method comprising the following steps:

determining a first signature point equal to the combination, by way of said operation, of elements equal to a derived first generator point of the curve and of number equal to a first intermediate scalar, and determining a second intermediate scalar by adding or subtracting, to or from a scalar resulting from a product of the first intermediate scalar and of a selected scalar, a scalar resulting from a product of a first derivation scalar and of a third intermediate scalar, determining a second signature point equal to the combination, by way of said operation, of elements equal to a selected point of the curve and of number equal to the second intermediate scalar, and of other elements equal to a point from among a derived second generator point or the opposite of the derived second generator point for said operation and of number equal to the third intermediate scalar, determining a signature portion based on the private key, on the first intermediate scalar, on an affine coordinate of the first signature point and on the datum, and wherein:

the derived first generator point is equal to the combination, by way of said operation, of elements equal to the generator point of the curve and of number equal to a second derivation scalar, the derived second generator point is equal to the combination, by way of said operation, of elements equal to the selected point of the curve and of number equal to the first derivation scalar, the signature of the datum comprises the signature portion and another signature portion determined based on an affine coordinate of the second signature point.

Further advantageous and non-limiting features of the method according to the invention, taken individually or in any technically possible combination, are as follows:

the other elements are equal to the derived second generator point and the step of determining the second intermediate scalar is based on subtraction, the other elements are equal to the opposite of said derived second generator point and the step of determining the second intermediate scalar is based on addition, the selected scalar is the second derivation scalar and the selected point is the generator point, the selected scalar has the value one and the selected point is the derived first generator point, the method furthermore comprises a step of determining the derived first generator point through combination, by way of said operation, of elements equal to the generator point of the curve and of number equal to the second derivation scalar and a step of determining the derived second generator point through combination, by way of said operation, of elements equal to the selected point of the curve and of number equal to the first derivation scalar, the second derivation scalar and the first derivation scalar are each determined through a random draw or by applying a pseudorandom algorithm to the datum, the third intermediate scalar has the value one, if the selected scalar has the value one, the third intermediate scalar has a non-zero value, the first intermediate scalar is determined through a random draw or by applying a pseudorandom algorithm to the datum, the third intermediate scalar is determined through a random draw, the second derivation scalar has a value strictly greater than one, the signature portion is equal, modulo the order of the group, to the scalar resulting from a product of the multiplicative inverse of the first intermediate scalar, of the multiplicative inverse of the second derivation scalar and of an intermediate signature scalar, said intermediate signature scalar being equal to the sum of a condensate of the datum by a hash function and of a scalar resulting from a product of the affine coordinate of the first signature point and of the private key, and the other signature portion is the affine coordinate of the second signature point.

the signature portion is equal, modulo the order of the group, to the sum of the first intermediate scalar and of a scalar resulting from a product of the private key and of a condensate of an intermediate datum by a hash function, said intermediate datum being the concatenation of the affine coordinate of the first signature point, of another affine coordinate of the first signature point, of two affine coordinates of another point of the curve and of the datum, and the method furthermore comprises a step of determining the other signature portion through concatenation of the affine coordinate of the second signature point and of another affine coordinate of the second signature point, the signature portion is equal, modulo the order of the group, to the sum of the first intermediate scalar and of a scalar resulting from a product of the private key and of a condensate of an intermediate datum by a hash function, said intermediate datum being the concatenation of the affine coordinate of the first signature point, of another affine coordinate of the first signature point and of the datum, and the method furthermore comprises a step of determining the other signature portion by applying the hash function to the concatenation of the affine coordinate of the second signature point, of another affine coordinate of the second signature point and of the datum, the step of determining the first signature point and the step of determining the signature portion are implemented in white box form, only the step of determining the first signature point and the step of determining the signature portion are implemented in white box form, the first signature point and the second signature point are computed in two different ways.

The invention also proposes a computer program comprising instructions able to be executed by a processor and designed to implement a method for cryptographic signature of a datum as defined above when these instructions are executed by the processor.

The invention also proposes an electronic device able to cryptographically sign a datum based on a private key and on a finite group of points of an elliptic curve, said group being provided with an operation of adding two points of the elliptic curve and comprising a generator point, said electronic device comprising a determination block for determining a first signature point equal to the combination, by way of said operation, of elements equal to a derived first generator point of the curve and of number equal to a first intermediate scalar, and a determination block for determining a signature portion based on the private key, on the first intermediate scalar, on an affine coordinate of the first signature point and on the datum, a determination block for determining a second intermediate scalar by adding or subtracting, to or from a scalar resulting from a product of the first intermediate scalar and of a selected scalar, a scalar resulting from a product of a first derivation scalar and of a third intermediate scalar, a determination block for determining a second signature point equal to the combination, by way of said operation, of elements equal to a selected point of the curve and of number equal to the second intermediate scalar, and of other elements equal to a point from among a derived second generator point or the opposite of the derived second generator point for said operation and of number equal to the third intermediate scalar, and wherein:

the derived first generator point is equal to the combination, by way of said operation, of elements equal to a generator point of the curve and of number equal to a second derivation scalar, the derived second generator point is equal to the combination, by way of said operation, of elements equal to the selected point of the curve and of number equal to the first derivation scalar, and the signature of the datum comprises the signature portion and another signature portion determined based on an affine coordinate of the second signature point.

This electronic device may be configured to implement each of the implementation options considered for the method for cryptographic signature of a datum as defined above.

Of course, the various features, variants and embodiments of the invention may be combined with one another in a variety of combinations provided that they are not incompatible or mutually exclusive.

Further features and advantages of the present invention will become apparent from the description given below, with reference to the appended figures, which illustrate exemplary embodiments of the invention that are completely non-limiting in nature.

In the figures:

FIG. 1 schematically shows the main elements of an electronic entity within which the invention is implemented;

FIG. 2 shows one example of an elliptic curve and of a group of points of the elliptic curve;

FIG. 3 shows, in the form of a flowchart, the main steps of a method for cryptographic signature of a datum according to a first mode of implementation of the invention;

FIG. 4 shows, in the form of a flowchart, the main steps of a method for cryptographic signature of a datum according to another mode of implementation of the invention.

Unless indicated otherwise, elements common to a plurality of figures or analogous elements in a plurality of figures have been designated with the same reference signs and have identical or analogous features, and hence these common elements have generally not been described more than once for the sake of simplicity.

FIG. 1 schematically shows an electronic device 2 comprising a processor 4 (for example a microprocessor), a storage module 6, a random access memory 8 and a communication module 10.

The random access memory 8 and the storage module 6 are each linked to the processor 4 such that the processor 4 is able to read or write data from or to each of these memories 6, 8.

The storage module 6 stores computer program instructions, some of which are designed to implement a cryptographic signature method such as at least one of those described with reference to FIGS. 3 and 4 when these instructions are executed by the processor 4. The storage module 6 is for example, in practice, a hard drive or a non-volatile memory that is possibly rewritable (for example of the type EEPROM, for "Electrically Erasable and Programmable Read-Only Memory").

The random access memory 8 may for its part store at least some of the elements (in particular the scalars and the points of an elliptic curve) that are manipulated in the various processing operations carried out during at least one of the methods described with reference to FIGS. 3 and 4.

The electronic device 2 also comprises a set of blocks (not shown), for example a determination block for determining a first signature point, a determination block for determining a signature portion, a determination block for determining a second intermediate scalar and a determination block for determining a second signature point. These blocks may in practice be formed by a combination of hardware elements and software elements. Each block has a functionality described in the methods according to the invention and explained below. Thus, for each block, the electronic device 2 stores for example software instructions able to be executed by the processor 4 of the electronic device 2 in order to use a hardware element (for example a communication interface or a memory) and thus implement the functionality offered by the block.

According to one possible embodiment, the computer program instructions stored in the storage module 6 were for example received (for example from a remote computer) during an operating phase of the electronic device 2 prior to the methods described with reference to FIGS. 3 and 4.

The invention is applicable in particular when the electronic device 2 is not secure and an attacker is therefore able to gain access to the internal operation of the electronic device 2, and thus to the processing operations carried out by the processor 4 and the data manipulated in these processing operations. (This is the framework of white-box cryptography mentioned in the introduction.)

The communication module 10 is connected to the processor 4 so as to allow the processor 4 to receive data from another electronic device (not shown) and/or to transmit data to another electronic device (not shown). In some embodiments, the processor 4 is thus able to receive a datum m from the other electronic device and/or to transmit other data, for example a result of at least one of the methods described with reference to FIGS. 3 and 4, typically the signature of the datum m, to the other electronic entity.

Each figure from among FIGS. 3 and 4 shows a method for cryptographic signature of a datum according to the invention.

Each of these cryptographic processing methods is implemented here by the electronic device 2 (due to the execution of the computer program instructions stored in the storage module 6 as indicated above).

Each of these methods performs operations in a group Gr of finite order n of points of an elliptic curve E. This group Gr is provided with an operation of adding two points of the elliptic curve E, referred to below as an operation. The elliptic curve E is defined by a set of parameters comprising a point of the group Gr called generator point G. This generator point is therefore predetermined and may in practice be stored in the electronic device 2, for example in its storage module 6. Any point of the group Gr may be associated uniquely with a set of c affine coordinates in a reference system of a space of dimension c.

Furthermore, each of these methods performs algebraic operations (addition, multiplication, subtraction) on scalars, explained below as addition, product and subtraction.

FIG. 2 shows one example of an elliptic curve E in an affine reference system of dimension 2, and one example of a group Gr of points of the elliptic curve E defined on a body K.

The invention is not limited to this example of an elliptic curve and of a group Gr. According to other examples, the elliptic curve E may have another shape in this reference system, or the elliptic curve E may be defined in another reference system and/or another space, in particular of dimension greater than 2.

FIG. 3 shows the main steps of a method for cryptographic signature of a datum according to a first mode of implementation of the invention.

The method of FIG. 3 aims to determine the signature of a datum m, for example received via the communication module 10, by way of a private key d and of an ECDSA algorithm.

In an initialization step E2, the processor 4 determines a first derivation scalar $t_1$ and a second derivation scalar $t_0$. The first derivation scalar $t_1$ and the second derivation scalar $t_0$ may each be determined through a random draw, by applying a pseudorandom algorithm, for example to the datum m, or by reading a memory of the electronic device 2, for example if the first derivation scalar $t_1$ and/or the second derivation scalar $t_0$ were determined beforehand and then stored in the storage module 6.

The second derivation scalar $t_0$ preferably has a value modulo the order n of the group Gr, which is strictly greater than one.

The method then comprises a step of determining a derived first generator point $T_0$ (step E4) equal to the combination, by way of the operation of the group Gr, of elements equal to the generator point G of the elliptic curve E and of number equal to the second derivation scalar $t_0$, for example by multiplying the generator point G by the second derivation scalar $t_0$.

This is denoted: $T_0 = [t_0] G$.

The step of determining a derived first generator point (step E4) may determine the derived first generator point $T_0$ through computing based on the second derivation scalar $t_0$ and on the generator point G, or by reading a memory of the electronic device 2, for example if the derived first generator point $T_0$ was computed beforehand and stored in its storage module 6.

The method also comprises a step of determining a derived second generator point $T_1$ (step E6) equal to the combination, by way of the operation of the group Gr, of elements equal to the generator point G of the elliptic curve E and of number equal to the first derivation scalar $t_1$, for example by multiplying the generator point G by the first derivation scalar $t_1$: $T_1=[t_1]$ G.

The step of determining a derived second generator point (step E6) may determine the derived second generator point $T_1$ through computing based on the first derivation scalar $t_1$ and on the generator point G, or by reading a memory of the electronic device 2, for example if the derived second generator point $T_1$ was computed beforehand and stored in the storage module 6.

The method then comprises a step of determining a first intermediate scalar (step E8) during which the processor 4 determines said first intermediate scalar k, for example through a random draw or by applying a pseudorandom algorithm, typically to the datum m.

The method also comprises a step of determining a third intermediate scalar (step E9) during which the processor 4 determines said third intermediate scalar k", for example through a random draw or by applying a pseudorandom algorithm, typically to the datum m. The third intermediate scalar (k") preferably has the value one. The computations implemented by the method are therefore reduced without reducing the robustness of said method.

The method then comprises a step of determining a first signature point $R_1$ (step E10) equal to the combination, by way of the operation of the group Gr, of elements equal to the derived first generator point $T_0$ of the curve and of number equal to the first intermediate scalar k, for example by multiplying the derived first generator point $T_0$ by the first intermediate scalar k: $R_1=[k]$ $T_0$.

The choice of a second derivation scalar $t_0$ greater than 1 makes it possible to be effective against side-channel and reverse engineering attacks since the first signature point $R_1$ is determined by combining elements equal to a derived first generator point $T_0$ that is different from the generator point G, which is generally known to the public.

The method then comprises a step of determining a second intermediate scalar (step E12) during which the second intermediate scalar k' is determined by adding, to a scalar resulting from a product of the first intermediate scalar k and of the second derivation scalar $t_0$, a scalar resulting from a product of the first derivation scalar $t_1$ and of the third intermediate scalar k". The second intermediate scalar k' therefore has the value $k \cdot t_0 + k'' \cdot t_1$.

According to one variant of the step of determining a second intermediate scalar (step E12), the second intermediate scalar k' is determined by subtracting, from a scalar resulting from a product of the first intermediate scalar k and of the second derivation scalar $t_0$, a scalar resulting from a product of the first derivation scalar $t_1$ and of the third intermediate scalar k". The second intermediate scalar k' therefore, in this variant of the step, has the value $k \cdot t_0 - k'' \cdot t_1$.

Thus, during the step of determining a second intermediate scalar (step E12), a second intermediate scalar k' is determined by adding or subtracting, to or from a scalar resulting from a product of the first intermediate scalar k and of a selected scalar, a scalar resulting from a product of a first derivation scalar $t_1$ and a third intermediate scalar k", the selected scalar being the second derivation scalar $t_0$.

The method also comprises a step of determining a second signature point $R_0$ (step E14) equal to the combination, by way of the operation of the group Gr, of elements equal to the generator point G of the curve and of number equal to the second intermediate scalar k' and of other elements equal to the opposite of the derived second generator point $T_1$ for said operation and of number equal to the third intermediate scalar k", for example by multiplying the generator point G by the second intermediate scalar k' and by multiplying, by the third intermediate scalar k", the opposite of the derived second generator point $T_1$, and then by adding, to the group Gr, the result of each of these multiplications: $R_0=[k']G-[k'']$ $T_1$.

According to one variant of the step of determining a second signature point (step E14), the second signature point $R_0$ is determined through combination, by way of the operation of the group Gr, of elements equal to the generator point G of the curve and of number equal to the second intermediate scalar k' and of other elements equal to the derived second generator point $T_1$ and of number equal to the third intermediate scalar k", for example by multiplying the generator point G by the second intermediate scalar k' and by multiplying, by the third intermediate scalar k", the derived second generator point $T_1$, and then by adding, to the group Gr, the result of each of these multiplications: $R_0=[k']G+[k'']$ $T_1$.

The step of determining a second signature point (step E14) thus determines a second signature point $R_0$ equal to the combination, by way of said operation, of elements equal to a selected point of the curve and of number equal to the second intermediate scalar k', and of other elements equal to a point from among a derived second generator point $T_1$ or the opposite of the derived second generator point $T_1$ for said operation and of number equal to the third intermediate scalar k", the selected point being the generator point G.

The variant of the step of determining a second signature point (step E14) is typically used when the step of determining a second intermediate scalar (step E12) is implemented in accordance with its variant that was described earlier.

Lastly, the method comprises a step of determining a signature portion (step E16) that determines a signature portion s based on the private key d, on the first intermediate scalar k, on an affine coordinate $r_1$ (typically an affine coordinate in a predetermined dimension in an affine reference system of a predetermined affine space) of the first signature point $R_1$ and on the datum m.

For example, in the context of the ECDSA signature algorithm, the signature portion s is equal, modulo the order of the group Gr, to the scalar resulting from the product of the multiplicative inverse of the first intermediate scalar k, of the multiplicative inverse of the second derivation scalar $t_0$ and of an intermediate signature scalar, said intermediate signature scalar being equal to the sum of a condensate e of the datum m by a hash function H and of a scalar resulting from a product of the affine coordinate $r_1$ (typically an affine coordinate in a predetermined first dimension in an affine reference system of a predetermined space) of the first signature point and of the private key d. In other words: $s=(k \cdot t_0)^{-1} \cdot (e+r_1 \cdot d)$ mod n with $e=H(m)$. The hash function H is typically an SHA-1, SHA-224, SHA-256, SHA-384, SHA-512, SHA3-224, SHA3-256, SHA3-384 or SHA3-512 algorithm.

At the end of the method of FIG. 3, the electronic device 2 therefore has the signature of the datum m by the ECDSA algorithm by way of the private key d, specifically the signature portion s and another signature portion determined based on an affine coordinate $r_0$ (typically in a predetermined second dimension in the affine reference system of the predetermined space, for example the first dimension described above) of the second signature point $R_0$. The other signature portion here is the affine coordinate $r_0$ of the second signature point $R_0$.

The attack mentioned in the introduction is no longer able to be carried out. Specifically, the attacker needs to know the value of the incorrect affine coordinate that is used in the computation of the signature portion. The first signature point and the second signature point are computed in two different ways. It would therefore be necessary for the attacker to inject the same fault twice, once into the computing of the affine coordinate of the first signature point and again into the computing of the affine coordinate of the second signature point. By implementing these two computing operations differently, the attack becomes impossible.

Preferably, if the selected scalar has the value one, the third intermediate scalar (k") has a non-zero value.

A person skilled in the art will understand that the steps of this method may be executed in other orders provided that each step has elements (for example scalars and/or points of the elliptic curve) needed for its execution.

According to a first example, the steps of determining a derived first generator point (step E4) and of determining a derived second generator point (step E6) may be executed in an arbitrary order.

According to a second example, the initialization step (step E2) may be carried out after the step of determining a derived first generator point (step E4) and/or after the step of determining a derived second generator point (step E6), in particular when determining the derived first generator point $T_0$ and/or the derived second generator point $T_1$ is based on reading a memory of the electronic device 2.

According to a third example, the steps of determining a first intermediate scalar (step E8) and of determining a third intermediate scalar (step E9) may be executed in an arbitrary order. The step of determining a first intermediate scalar (step E8) and/or the step of determining a third intermediate scalar (step E9) may be executed before any of steps E2 to E6.

According to a fourth example, the step of determining a first signature point (step E10) may be carried out any time after the step of determining a derived first generator point (step E4) and the step of determining a first intermediate scalar (step E8), but before the step of determining a signature portion (step E16).

According to a fifth example, the step of determining a second signature point (step E14) may be carried out any time after the step of determining a derived second generator point (step E6) and the step of determining a second intermediate scalar (step E12).

According to a final example, the step of determining a signature portion (step E16) may be carried out any time after the step of determining a first signature point (step E10).

FIG. 4 shows, in the form of a flowchart, a method for cryptographic signature of a datum according to another mode of implementation of the invention.

The method of FIG. 4 also aims to determine the signature of a datum m, for example received via the communication module 10, by way of a private key d and of an ECDSA algorithm.

The method of FIG. 4 comprises an initialization step E2 identical to the initialization step E2 of the first embodiment.

The method then comprises a step of determining a derived first generator point $T_0$ (step E4) identical to that of the first mode of implementation.

The method also comprises a step of determining a derived second generator point $T_1$ (step E106) equal to the combination, by way of the operation of the group Gr, of elements equal to the derived first generator point $T_0$ of the elliptic curve E and of number equal to the first derivation scalar $t_1$.

For example, the step of determining a second generator point is performed by multiplying the derived first generator point $T_0$ by the first derivation scalar $t_1$, or, according to another example, by multiplying the generator point G by the scalar resulting from a product of the first derivation scalar $t_1$ and of the second derivation scalar $t_0$: $T_1 = [t_1 \cdot t_0] G = [t_1] T_0$.

This step of determining a derived second generator point may determine the derived second generator point $T_1$ through computing based on the first derivation scalar $t_1$ and on the derived first generator point $T_0$, or through computing based on the first derivation scalar $t_1$, on the second derivation scalar $t_0$ and on the generator point G, or by reading a memory of the electronic device 2, for example if the derived second generator point $T_1$ was computed beforehand and stored in its storage module 6.

The method then comprises a step of determining a first intermediate scalar (step E8), a step of determining a third intermediate scalar (step E9), and then a step of determining a first signature point $R_1$ (step E10), said steps being identical to those described for the first mode of implementation.

The method then comprises a step of determining a second intermediate scalar (step E112) during which the second intermediate scalar k' is determined by adding, to the first intermediate scalar k, a scalar resulting from the product of the first derivation scalar $t_1$ and of the third intermediate scalar k". The second intermediate scalar k' therefore has the value k+k"·$t_1$.

According to one variant of this step of determining a second intermediate scalar (step E112), the second intermediate scalar k' is determined by subtracting, from the first intermediate scalar k, a scalar resulting from a product of the first derivation scalar $t_1$ and of the third intermediate scalar k". The second intermediate scalar k' therefore, in this variant of the step, has the value k−k"·$t_1$.

Thus, during this step of determining a second intermediate scalar (step E112), a second intermediate scalar k' is determined by adding or subtracting, to or from a scalar resulting from a product of the first intermediate scalar k and of a selected scalar, a scalar resulting from a product of a first derivation scalar $t_1$ and of a third intermediate scalar k", the selected scalar having the value 1.

The method also comprises a step of determining a second signature point $R_0$ (step E114) equal to the combination, by way of the operation of the group Gr, of elements equal to the derived first generator point $T_0$ of the curve and of number equal to the second intermediate scalar k' and of other elements equal to the opposite of the derived second generator point $T_1$ for said operation and of number equal to the third intermediate scalar k", for example by multiplying the derived first generator point $T_0$ by the second intermediate scalar k' and by multiplying, by the third intermediate scalar k", the opposite of the derived second generator point $T_1$, and then by adding, to the group Gr, the result of each of these multiplications:

$$R_0 = [k']T_0 - [k'']T_1.$$

According to one variant of this step of determining a second signature point (step E114), the second signature point $R_0$ is determined through combination, by way of the operation of the group Gr, of elements equal to the derived first generator point $T_0$ of the curve and of number equal to the second intermediate scalar k' and of other elements equal to the derived second generator point $T_1$ and of number equal to the third intermediate scalar k''', for example by multiplying the derived first generator point $T_0$ by the second intermediate scalar k' and by multiplying, by the third intermediate scalar k''', the derived second generator point $T_1$, and then by adding, to the group Gr, the result of each of these multiplications: $R_0$=[k'] $T_0$+[k''] $T_1$.

This step of determining a second signature point (step E114) thus determines a second signature point $R_0$ equal to the combination, by way of said operation, of elements equal to a selected point of the curve and of number equal to the second intermediate scalar k', and of other elements equal to a point from among a derived second generator point $T_1$ or the opposite of the derived second generator point $T_1$ for said operation and of number equal to the third intermediate scalar k''', the selected point being the derived first generator point $T_0$.

The variant of this step of determining a second signature point (step E114) is typically used when the step of determining a second intermediate scalar (step E112) is implemented in accordance with its variant that was described earlier.

Finally, the method comprises a step of determining a signature portion (step E16) identical to that of the first mode of implementation.

At the end of the method of FIG. 4, the electronic device 2 therefore has the signature of the datum m by the ECDSA algorithm by way of the private key d, specifically the signature portion s and another signature portion determined based on an affine coordinate $r_0$ (typically in a predetermined second dimension in the affine reference system of the predetermined space, for example the first dimension described for the affine coordinate $r_1$ of the first signature point $R_1$ in the step of determining a signature portion E16) of the second signature point $R_0$. The other signature portion here is the affine coordinate $r_0$ of the second signature point $R_0$.

The attack mentioned in the introduction is no longer able to be carried out. Specifically, the attacker needs to know the value of the incorrect affine coordinate that is used in the computation of the signature portion. The first signature point and the second signature point are computed in two different ways. It would therefore be necessary for the attacker to inject the same fault twice, once into the computing of the affine coordinate of the first signature point and again into the computing of the affine coordinate of the second signature point. By implementing these two computing operations differently, the attack becomes impossible.

Preferably, with the selected scalar having the value one, the third intermediate scalar (k''') has a non-zero value.

A person skilled in the art will understand that the steps of this method may be executed in other orders provided that each step has elements (for example scalars and/or points of the elliptic curve) needed for its execution.

According to a first example, the step of determining a derived second generator point (step E106) may be executed before the step of determining a derived first generator point (step E4), when the derived second generator point $T_1$ is determined through computing based on the first derivation scalar $t_1$, on the second derivation scalar $t_0$ and on the generator point G, or by reading a memory of the electronic device 2.

According to a second example, the initialization step (step E2) may be carried out after the step of determining a derived first generator point (step E4) and/or after the step of determining a derived second generator point (step E6), in particular when determining the derived first generator point $T_0$ and/or the derived second generator point $T_1$ is based on reading a memory of the electronic device 2.

According to a third example, the steps of determining a first intermediate scalar (step E8) and of determining a third intermediate scalar (step E9) may be executed in an arbitrary order. The step of determining a first intermediate scalar (step E8) and/or the step of determining a third intermediate scalar (step E9) may be executed before any of the initialization step (step E2), the step of determining a derived first generator point (step E4) and the step of determining a derived second generator point (step E106).

According to a fourth example, the step of determining a first signature point (step E10) may be carried out any time after the step of determining a derived first generator point (step E4) and the step of determining a first intermediate scalar (step E8).

According to a fifth example, the step of determining a second signature point (step E114) may be carried out any time after the step of determining a derived first generator point (step E4), the step of determining a derived second generator point (step E106) and the step of determining a second intermediate scalar (step E112).

According to a final example, the step of determining a signature portion (step E16) may be carried out any time after the step of determining a first signature point (step E10).

A description has been given above of two embodiments of a method for the ECDSA cryptographic signature of a datum according to the invention.

As a variant, these embodiments may be adapted for a cryptographic signature of the datum by way of an EdDSA algorithm. In this case, the step of determining a signature portion (step E16) also determines a signature portion s based on the private key d, on the first intermediate scalar k, on the affine coordinate $r_1$ (typically an affine coordinate in a predetermined first dimension in an affine reference system of a predetermined space) of the first signature point $R_1$ and on the datum m. However, in this variant, this step of determining a signature portion (step E16) determines a signature portion s that is equal, modulo the order n of the group Gr, to the sum of the first intermediate scalar k and of a scalar resulting from a product of the private key d and of a condensate of an intermediate datum m' by a hash function H, said intermediate datum m' being the concatenation of the affine coordinate $r_1$ of the first signature point, of another affine coordinate $r_{y1}$ (typically an affine coordinate in a predetermined first other dimension that is different from the predetermined first dimension in the affine reference system of the predetermined space) of the first signature point, of two affine coordinates q and $q_y$ (typically respectively an affine coordinate in the predetermined first dimension and the predetermined first other dimension in the affine reference system of the predetermined space) of another point Q of the curve E, and of the datum m. In other words: s=k+d·H($r_1$|$r_{y1}$|q|$q_y$|m) mod n. The hash function H is typically an SHA-512 or SHAKE256 algorithm.

The methods of FIGS. 3 and 4 adapted in this way may be supplemented with a step of determining another signature portion u (step E200) that determines the other signature portion u through concatenation of an affine coordinate $r_0$ (typically in a predetermined second dimension in the affine reference system of the predetermined space, for example the predetermined first dimension) of the second signature point $R_0$ and of another affine coordinate $r_{y0}$ (typically in a predetermined second other dimension in the affine reference system of the predetermined space, for example the predetermined first other dimension) of the second signature point $R_0$. In other words: $u=r_0|r_{y0}$.

At the end of the method of FIG. 3 or of the method of FIG. 4, the electronic device 2 therefore has the signature of the datum m by the EdDSA algorithm by way of the private key d, specifically the signature portion s described above and the other signature portion u determined by the step of determining another signature portion (step E200) based on an affine coordinate $r_0$ of the second signature point $R_0$.

According to another variant, the two embodiments described with reference to FIGS. 3 and 4 may be adapted for a cryptographic signature of the datum m by way of a Schnorr signature algorithm. In this case, the step of determining a signature portion E16 also determines a signature portion s based on the private key d, on the first intermediate scalar k, on the affine coordinate $r_1$ (typically an affine coordinate in a predetermined first dimension in an affine reference system of a predetermined space) of the first signature point $R_1$ and on the datum m. However, in this other variant, the step of determining a signature portion E16 determines a signature portion s that is equal, modulo the order n of the group Gr, to the sum of the first intermediate scalar k and of a scalar resulting from a product of the private key d and of a condensate of an intermediate datum m' by a hash function H, said intermediate datum m' being the concatenation of the affine coordinate $r_1$ of the first signature point, of another affine coordinate $r_{y1}$ (typically an affine coordinate in a predetermined first other dimension that is different from the predetermined first dimension in the affine reference system of the predetermined space) of the first signature point $R_1$, and of the datum m. In other words: $s=k+d\cdot H(r_1|r_{y1}|m)$ mod n. The hash function H is typically an SHA-1, SHA-224, SHA-256, SHA-384, SHA-512, SHA3-224, SHA3-256, SHA3-384 or SHA3-512 algorithm, the result of which may optionally be truncated.

The methods of FIGS. 3 and 4 adapted in this way may be supplemented with another step of determining another signature portion u (step E201) in which the other signature portion u is determined by applying the hash function H to the concatenation of an affine coordinate $r_0$ (typically in a predetermined second dimension in the affine reference system of the predetermined space, for example the predetermined first dimension) of the second signature point $R_0$, of another affine coordinate $r_{y0}$ (typically in a predetermined second other dimension in the affine reference system of the predetermined space, for example the predetermined first other dimension) of the second signature point $R_0$, and of the datum m. In other words: $u=H(r_0|r_{y0}|m)$.

At the end of the method of FIG. 3 or of the method of FIG. 4, the electronic device 2 therefore has the signature of the datum m by the Schnorr signature algorithm by way of the private key d, specifically the signature portion s described above and the other signature portion u determined by the other step of determining another signature portion (step E201) based on an affine coordinate $r_0$ of the second signature point $R_0$.

As already mentioned, a person skilled in the art will understand that the steps of each method may be executed in other orders provided that each step has elements (for example scalars and/or points of the elliptic curve) needed for its execution.

It will thus be noted that the step of determining another signature portion E200 and the other step of determining another signature portion E201 may be executed any time after the step of determining a second signature point (step E14) of the method described with reference to FIG. 3 or the step of determining a second signature point (step E114) of the method described with reference to FIG. 4.

It will be noted that, with these variant embodiments of a cryptographic signature of the datum by way of an EdDSA algorithm or a Schnorr algorithm, the attack mentioned in the introduction is no longer able to be carried out. Specifically, the attacker needs to know the value of the incorrect affine coordinates of the signature point that is used in the computation of the signature portion. The first signature point and the second signature point are computed in two different ways. It would therefore be necessary for the attacker to inject the same fault twice, once into the computing of the two affine coordinates of the first signature point and again into the computing of the two affine coordinates of the second signature point. By implementing these two computing operations differently, the attack becomes impossible.

Preferably, if the selected scalar has the value one, the third intermediate scalar (k") has a non-zero value.

Regardless of the embodiment and/or variant embodiment, it will be noted that the computations involved in the processing of points on the elliptic curve E are generally themselves carried out by performing operations (additions, subtractions and products) in another finite body on one or more coordinates of the one or more points in question (for example for each point, one or more affine coordinates, and not necessarily the affine coordinates in all dimensions of the associated affine reference system, or, according to another example, for each point, one or more projective coordinates, and not necessarily the projective coordinates in all dimensions of the associated projective reference system).

Lastly, regardless of the embodiment and/or variant embodiment of the method for cryptographic signature of a datum according to the invention, the step of determining the first signature point $R_1$ and the step of determining the signature portion s may be implemented in white box form.

The method is thus resistant to the attack mentioned in the prior art when the method is implemented in a non-secure device.

Preferably, only the step of determining the first signature point $R_1$ and the step of determining the signature portion s are implemented in white box form.

The method is thus resistant to the attack mentioned in the prior art when the method is implemented in a non-secure device, while at the same time limiting the memory consumption of said device and the computations associated with this implementation.

A person skilled in the art will understand that the embodiments, variants and various features described above may be combined with one another in a variety of combinations provided that they are not incompatible or mutually exclusive.

The invention claimed is:

1. A method for processing a cryptographic signature of a datum, implemented within an electronic device based on a private key and on a finite group of points of an elliptic curve, said group being provided with an operation of adding two points of the elliptic curve and comprising a generator point, the method comprising the following steps:

determining a first signature point equal to combination, by way of said operation, of elements equal to a derived first generator point of the curve and of a number equal to a first intermediate scalar, and determining a second intermediate scalar by adding or subtracting, to or from a scalar resulting from a product of the first intermediate scalar and of a selected scalar, a scalar resulting from a product of a first derivation scalar and of a third intermediate scalar, determining a second signature point equal to combination, by way of said operation, of elements equal to a selected point of the curve and of a number equal to the second intermediate scalar, and of other elements equal to a point from among a derived second generator point or the opposite of the derived second generator point for said operation and of a number equal to the third intermediate scalar, determining a signature portion based on the private key, on the first intermediate scalar, on an affine coordinate of the first signature point and on the datum, and wherein:

the derived first generator point is equal to combination, by way of said operation, of elements equal to the generator point of the curve and of a number equal to a second derivation scalar, the derived second generator point is equal to combination, by way of said operation, of elements equal to the selected point of the curve and of a number equal to the first derivation scalar, the signature of the datum comprises the signature portion and another signature portion determined based on an affine coordinate of the second signature point.

2. The method for processing a cryptographic signature of a datum according to claim 1, wherein:

the other elements are equal to the derived second generator point and the step of determining the second intermediate scalar is based on subtraction, or the other elements are equal to the opposite of said derived second generator point and the step of determining the second intermediate scalar is based on addition.

3. The method for processing a cryptographic signature of a datum according to claim 1, wherein:

the selected scalar is the second derivation scalar and the selected point is the generator point, or the selected scalar has the value one and the selected point is the derived first generator point.

4. The method for processing a cryptographic signature of a datum according to claim 1, said method furthermore comprising the following steps:

determining the derived first generator point through combination, by way of said operation, of elements equal to the generator point of the curve and of the number equal to the second derivation scalar, determining the derived second generator point through combination, by way of said operation, of elements equal to the selected point of the curve and of the number equal to the first derivation scalar.

5. The method for processing a cryptographic signature of a datum according to claim 1, wherein the second derivation scalar and the first derivation scalar are each determined through a random draw or by applying a pseudorandom algorithm to the datum.

6. The method for processing a cryptographic signature of a datum according to claim 1, wherein, if the selected scalar has the value one, the third intermediate scalar has a non-zero value.

7. The method for processing a cryptographic signature of a datum according to claim 1, wherein the first intermediate scalar is determined through a random draw or by applying a pseudorandom algorithm to the datum.

8. The method for processing a cryptographic signature of a datum according to claim 1, wherein the second derivation scalar has a value strictly greater than one.

9. The method for processing a cryptographic signature of a datum according to claim 1, wherein the signature portion is equal, modulo the order of the group, to the scalar resulting from a product of multiplicative inverse of the first intermediate scalar, of multiplicative inverse of the second derivation scalar and of an intermediate signature scalar, said intermediate signature scalar being equal to the sum of a condensate of the datum by a hash function and of a scalar resulting from a product of the affine coordinate of the first signature point and of the private key, and the other signature portion is the affine coordinate of the second signature point.

10. The method for processing a cryptographic signature of a datum according to claim 1, wherein the signature portion is equal, modulo the order of the group, to sum of the first intermediate scalar and of a scalar resulting from a product of the private key and of a condensate of an intermediate datum by a hash function, said intermediate datum being concatenation of the affine coordinate of the first signature point, of another affine coordinate of the first signature point, of two affine coordinates of another point of the curve and of the datum, and furthermore comprising a step of determining the other signature portion through concatenation of the affine coordinate of the second signature point and of another affine coordinate of the second signature point.

11. The method for processing a cryptographic signature of a datum according to claim 1, wherein the signature portion is equal, modulo the order of the group, to sum of the first intermediate scalar and of a scalar resulting from a product of the private key and of a condensate of an intermediate datum by a hash function, said intermediate datum being concatenation of the affine coordinate of the first signature point, of another affine coordinate of the first signature point and of the datum, and furthermore comprising a step of determining the other signature portion by applying the hash function to the concatenation of the affine coordinate of the second signature point, of another affine coordinate of the second signature point and of the datum.

12. The method for processing a cryptographic signature of a datum according to claim 1, wherein the step of determining the first signature point and the step of determining the signature portion are implemented in white box form.

13. The method for processing a cryptographic signature of a datum according to claim 12, wherein only the step of determining the first signature point and the step of determining the signature portion are implemented in white box form.

14. The method for processing a cryptographic signature of a datum according to claim 1, wherein the first signature point and the second signature point are computed in two different ways.

15. A non-transitory computer readable medium that stores computer program comprising instructions able to be executed by a processor and designed to implement a method according to claim 1 when these instructions are executed by the processor.

16. An electronic device able to cryptographically sign a datum based on a private key and on a finite group of points of an elliptic curve, said group being provided with an operation of adding two points of the elliptic curve and comprising a generator point, said electronic device comprising a determination block for determining a first signature point equal to the combination, by way of said operation, of elements equal to a derived first generator point of the curve and of a number equal to a first intermediate scalar, and a determination block for determining a signature portion based on the private key, on the first intermediate scalar, on an affine coordinate of the first signature point and on the datum, a determination block for determining a second intermediate scalar by adding or subtracting, to or from a scalar resulting from a product of the first intermediate scalar and of a selected scalar, a scalar resulting from a product of a first derivation scalar and of a third intermediate scalar, a determination block for determining a second signature point equal to the combination, by way of said operation, of elements equal to a selected point of the curve and of a number equal to the second intermediate scalar, and of other elements equal to a point from among a derived second generator point or the opposite of the derived second generator point for said operation and of a number equal to the third intermediate scalar, and wherein:

the derived first generator point is equal to the combination, by way of said operation, of elements equal to a generator point of the curve and of a number equal to a second derivation scalar, the derived second generator point is equal to the combination, by way of said operation, of elements equal to the selected point of the curve and of a number equal to the first derivation scalar, and the signature of the datum comprises the signature portion and another signature portion determined based on an affine coordinate of the second signature point.

* * * * *